US005844705A

United States Patent [19]

Rutledge

[11] Patent Number: 5,844,705

[45] Date of Patent: Dec. 1, 1998

[54] WIRELESS COMMUNICATIONS SYSTEMS EMPLOYING FREE-SPACE OPTICAL COMMUNICATIONS LINKS

[75] Inventor: Christopher L. Rutledge, Somerset, N.J.

[73] Assignee: AT&T Corp, Middletown, N.J.

[21] Appl. No.: 799,885

[22] Filed: Feb. 13, 1997

[51] Int. Cl.[6] .................................................. H04B 10/00

[52] U.S. Cl. ........................ 359/167; 359/145; 359/152; 359/172

[58] Field of Search .................................. 359/145, 152, 359/167, 172, 130; 370/310; 455/14, 561–562

[56] References Cited

U.S. PATENT DOCUMENTS 5,067,173 11/1991 Gordon et al. ........................ 359/152
5,301,056 4/1994 O'Neill .................................. 359/145
5,493,436 2/1996 Karasawa et al. ..................... 359/145

*Primary Examiner*—Kinfe-Michael Negash

[57] ABSTRACT

The cells of a wireless communications system can be subdivided into smaller subcells, in each of which the available radio frequencies can be re-used to allow denser use of the system. To avoid having to run hard-wired communications links to broadcast antennas of the subcells, substantially unguided, free-space, optical communication is used between the antenna that formerly served the cell and the subcell antennas. The existing hard-wired connection from the central antenna to the remainder of the wireless communications system infrastructure continues to be used for communication to and from the cell.

32 Claims, 3 Drawing Sheets

WIRELESS COMMUNICATIONS SYSTEMS EMPLOYING FREE-SPACE OPTICAL COMMUNICATIONS LINKS

BACKGROUND OF THE INVENTION

This invention relates to wireless communications systems such as cellular telephone systems, and more particularly to wireless communications systems with increased communication capacity.

Wireless communications systems such as cellular telephone systems rely on a relatively small number of radio frequencies that are broadcast from relatively low-power transceivers so that the signals travel only a relatively short distance from the transceiver (e.g., approximately to the boundary of a cell having a radius of one to three miles from the transceiver). The same radio frequencies can therefore be reused for other messages in nearby cells without unacceptable interference between the different messages on the same frequencies in different cells. However, because the number of radio frequencies allowed for this type of communication is limited by governmental regulation and other considerations, only a correspondingly limited number of cellular telephone calls can be supported in any given cell at any one time. In high usage areas this may prevent some calls from being completed and/or may force some callers to wait for service. This is obviously undesirable.

One possible approach to increasing the number of calls that can be simultaneously supported in an area is to reduce the size of the cells. This allows greater reuse of the available radio frequencies. For example, a conventional cell may be subdivided into a plurality of subcells, each having a transceiver of even lower power than the conventional transceiver associated with a conventional cell. If a conventional cell is subdivided into four subcells, it is theoretically possible to support four times as many calls in the area of the original cell as could be supported if the cell were not subdivided.

A possible disincentive to subdividing cells is the expense of running high-grade, hard-wired communications links such as optical fiber to all the new subcell transceiver locations.

In view of the foregoing, it is an object of this invention to reduce the cost and difficulty of increasing the capacity of wireless communications systems.

It is a more particular object of the invention to provide wireless communications systems with subcells that do not have hard-wired connections to all the subcell transceiver locations.

SUMMARY OF THE INVENTION

These and other objects of the invention are accomplished in accordance with the principles of the invention by using point-to-point, substantially unguided, free-space, optical communication between a central location in a wireless communications system cell and each of a plurality of subcell transceivers in that cell. For example, the central location may be the location of the pre-existing radio frequency transceiver of the cell. This transceiver is converted to a plurality of central optical transceivers. Each of the subcells is provided with an optical transceiver that is centrally located within the associated subcell and therefore remote from the previously mentioned central optical transceivers. Each subcell optical transceiver is optically coupled to a respective one of the central optical transceivers by a substantially unguided, free-space, optical communications link (e.g., bi-directional, line-of-sight, infrared transmission). Each subcell also includes a radio frequency transceiver for serving wireless communications units (e.g., mobile or cellular telephones) in that subcell. And each subcell includes circuitry for interfacing between its optical and radio frequency transceivers. The central optical transceivers typically communicate with portions of the overall system beyond the cell via a hard-wired acommunications link (e.g., a bi-directional fiber optic link to a mobile telephone switching office).

The use of substantially unguided, free-space, optical communications between the central optical transceivers and the subcell transceivers avoids the need for additional, hard-wired connections to new subcell transceiver locations. This reduces the cost of providing smaller wireless communications cells and therefore wireless communications systems with greater capacity through the greater reuse of a limited number of radio frequencies.

Further features of the invention, its nature and various advantages, will be more apparent from the accompanying drawings and the following detailed description of the preferred embodiments.

DETAILED DESCRIPTION OF THE PREFERRED EMBODIMENTS

Figure 1:
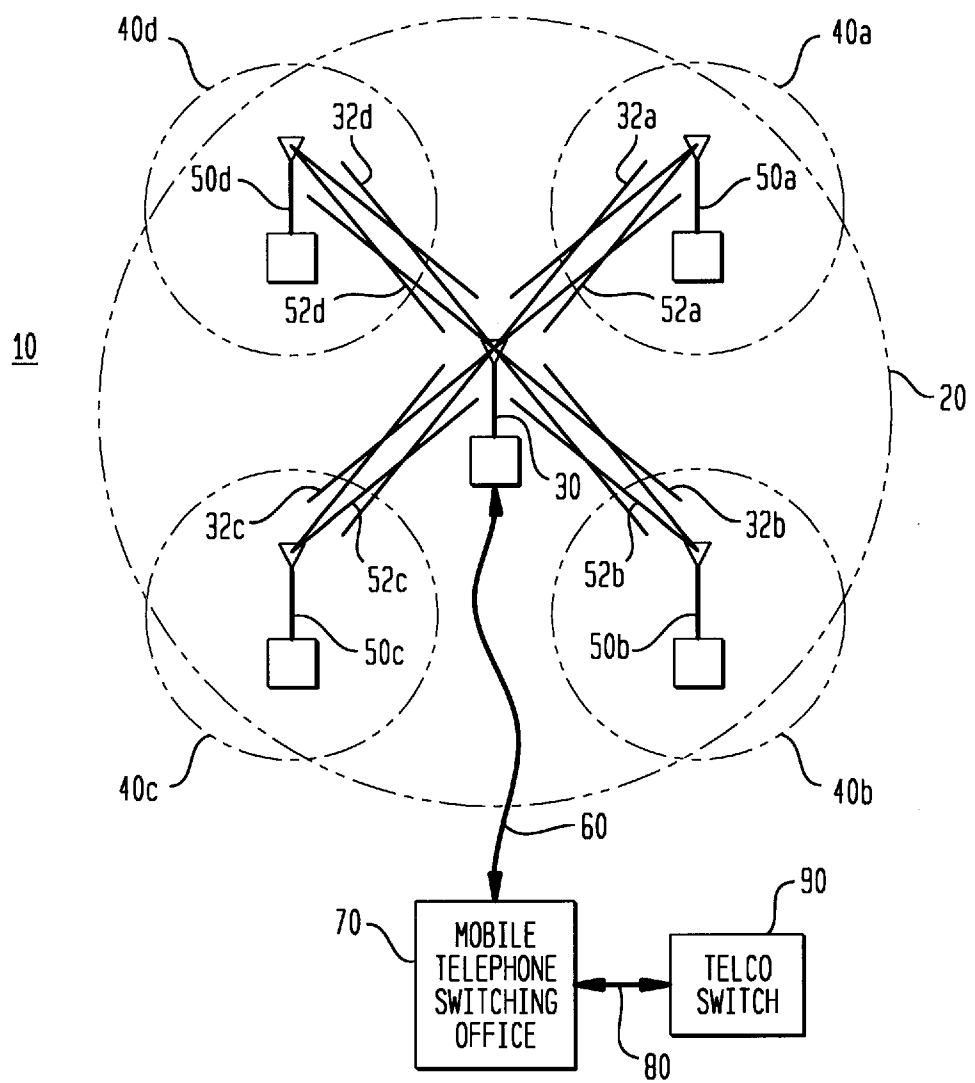
FIG. 1 is a simplified schematic diagram of a representative portion of an illustrative embodiment of a wireless communications system constructed in accordance with this invention.

In FIG. 1 chain-dotted line 20 represents the approximate boundary of a conventional cell in wireless communications system 10. For example, cell 20 may be approximately circular with a radius in the range from about one to three miles from a central antenna 30. In accordance with the present invention, cell 20 is subdivided into a plurality of subcells 40*a–d*. Each of subcells 40*a–d* is served by a respective antenna 50*a–d.* The apparatus at antenna 30 communicates with switching equipment 70 (e.g., a mobile telephone switching office) via hard-wired communications link 60. Link 60 is preferably optical fiber, but it can alternatively be an electronic link. Cell 20 is only representative of several similar cells that may be similarly served by switching office 70. Switching office 70 is connected to conventional telephone company switching equipment 90 via communications link 80 for communication with the global communications network generally. If desired, components 70 and 90 may be at the same physical location.

Although it is generally assumed in this discussion that communications system 10 is a cellular telephone system, it will be understood that the invention is equally applicable to any type of wireless communications system (e.g., paging systems, cellular telephone systems with enhanced features, and the like).

The apparatus at antenna 30 communicates with the apparatus at each of antennas 50*a–d* via substantially unguided optical communication between the antennas. In particular, antenna 30 has light sources for sending light 32*a–d* through the atmosphere to each of antennas 50*a–d.*

Each antenna 50*a–d* receives the light thus transmitted to it from antenna 30 and broadcasts radio frequency signals within the associated subcell 40*a–d* corresponding to the information received optically (or an appropriate part of that information). Cellular telephones that are in use within a subcell 40*a–d* receive this radio frequency information and use other, dynamically assigned radio frequencies to send other information back to the associated antenna 50*a–d.* The apparatus at each subcell antenna 50*a–d* uses a modulated light source which is part of that apparatus to send that information from the antenna 50*a–d* back to antenna 30 via substantially unguided light 52*a–d.* The apparatus associated with antenna 30 places the information thus received from antennas 50*a–d* on communications link 60 for transmission to switching office 70 and, if necessary, on to switch 90. Infrared light is preferably used for optical links 32*a–d* and 52*a–d.*

The use of substantially unguided, free-space, optical links 32*a–d* and 52*a–d* between antenna 30, on the one hand, and antennas 50*a–d,* on the other hand, facilitates subdividing cell 20 into subcells 40*a*–40*d* without the expense of having to provide hard-wired connections like link 60 from switching office 70 to all of antennas 50*a–d.* For example, a pre-existing link 60 between switching office 70 and a formerly radio-frequency transceiver 30 can be reused in this system. Transceiver 30 is converted from a radio frequency transceiver to a plurality of optical transceivers for optical communication with transceivers 50*a–d.* No additional hard-wired connections are needed between switching office 70 and transceivers 50*a–d.*

Figure 2:
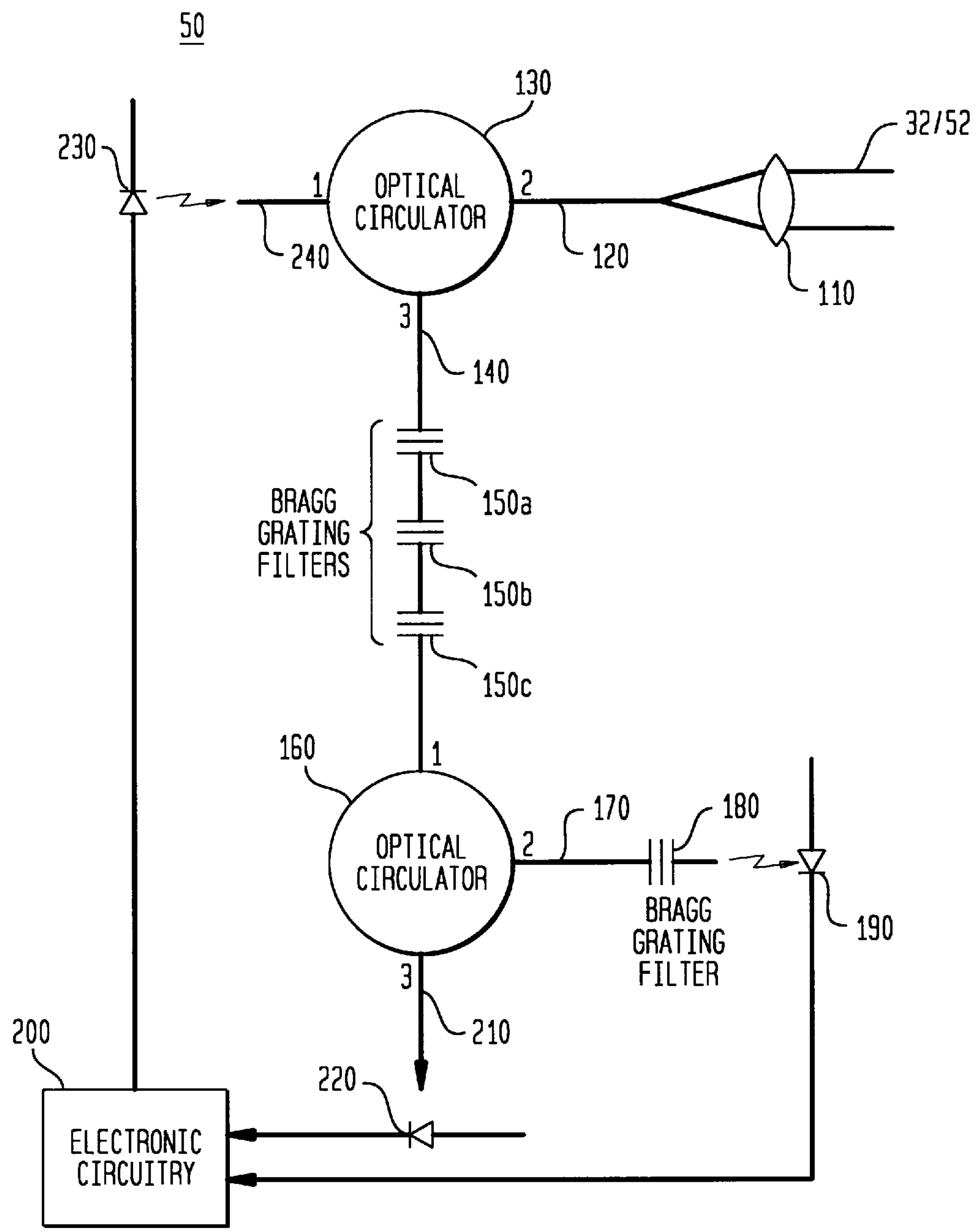
FIG. 2 is a simplified schematic diagram of an illustrative embodiment of a portion of the apparatus shown in FIG. 1.

An illustrative embodiment of the optical portion of representative subcell apparatus 50 in accordance with this invention is shown in FIG. 2. Consideration will first be given to the processing of incoming light 32 from antenna 30. It is assumed that incoming light 32 includes five different wavelength-division-multiplexed light wavelengths. Four of these wavelengths are respectively the message information signals for the four subcells 40*a–d* served by antenna 30. The fifth wavelength is a control information signal shared by all of the subcells 40*a–d* served by antenna 30. For example, this control information may determine the radio frequencies used by the apparatus at each of remote antennas 50*a–d* for communication with the cellular telephones being served from that remote antenna.

Collimating lens 110 focuses incoming light 32 into optical fiber 120 leading to port 2 of forward propagating optical circulator 130. As is conventional for such devices, forward propagating optical circulator 130 propagates optical information from port 1 to port 2, and from port 2 to port 3, but not from port 3 to port 1. (This characteristic is extendable to any number of ports.) Thus in FIG. 2 optical circulator 130 applies the incoming light from port 2 to the optical fiber 140 connected to its port 3.

Optical fiber 140 contains Bragg grating filters 150*a–c* for blocking the further propagation of the three message information signal wavelengths that are not used by the representative subcell apparatus being discussed. These three wavelengths are the message information signal wavelengths used respectively by the three other subcells 40 within cell 20. Each Bragg grating 150 is a wavelength selective mirror formed into fiber 140 with a reflectivity approaching 100% at the wavelength blocked by that grating. The cumulative effect of Bragg gratings 150*a–c* is therefore to allow only the message information signal wavelength to be used by subcell apparatus 50 and the control signal wavelength to be applied to port 1 of forward propagating optical circulator 160. (Note that circulator 130 blocks the light reflected by Bragg gratings 150. This is so because circulator 130 does not propagate either from port 3 to port 2 or from port 3 to port 1.)

Circulator 160 applies the light it receives via port 1 to the optical fiber 170 which is connected to its port 2. Optical fiber 170 includes Bragg grating filter 180 for blocking further propagation along that fiber of the control signal wavelength. Thus only the message information signal wavelength to be used by subcell apparatus 50 passes through Bragg grating 180 and is optically coupled to photodetector 190. Photodetector 190 is the message information signal input to the electronic circuitry 200 of subcell apparatus 50.

Bragg grating 180 reflects the control signal wavelength back to port 2 of optical circulator 160. Accordingly, circulator 160 applies the control signal wavelength from port 2 to the optical fiber 210 connected to its port 3. Optical fiber 210 is optically coupled to photodetector 220, which is the control signal input to electronic circuitry 200.

Electronic circuitry 200 uses the control and message information signals it receives from elements 190 and 220 to produce and broadcast the radio signal frequencies that it needs to send to the cellular telephones in the associated subcell 40. Electronic circuitry 200 also receives and processes the signals transmitted back by those cellular telephones. The radio frequency aspects of the operation of subcell apparatus 50 may be substantially conventional (except that the broadcast power and reception sensitivity of the apparatus may be reduced to be commensurate with the relatively small geographical area of a subcell 40 as compared to a conventional cell 20).

Radio frequency signals received by subcell apparatus 50 from cellular telephones in the associated subcell are processed by the electronic circuitry in the substantially conventional way and applied as a modulating signal to light source 230. Light from light source 230 is optically coupled to optical fiber 240, which is connected to port 1 of optical circulator 130. Accordingly, light from port 1 of circulator 130 is applied to optical fiber 120 and passed out through collimating lens 110 for transmission back to transceiver 30 as substantially unguided light 52.

The wavelength of light source 230 is preferably different from any of incoming wavelengths 32. Each of the subcells 40 in a cell 20 also preferably has its own unique light source 230 wavelength.

Figure 3:
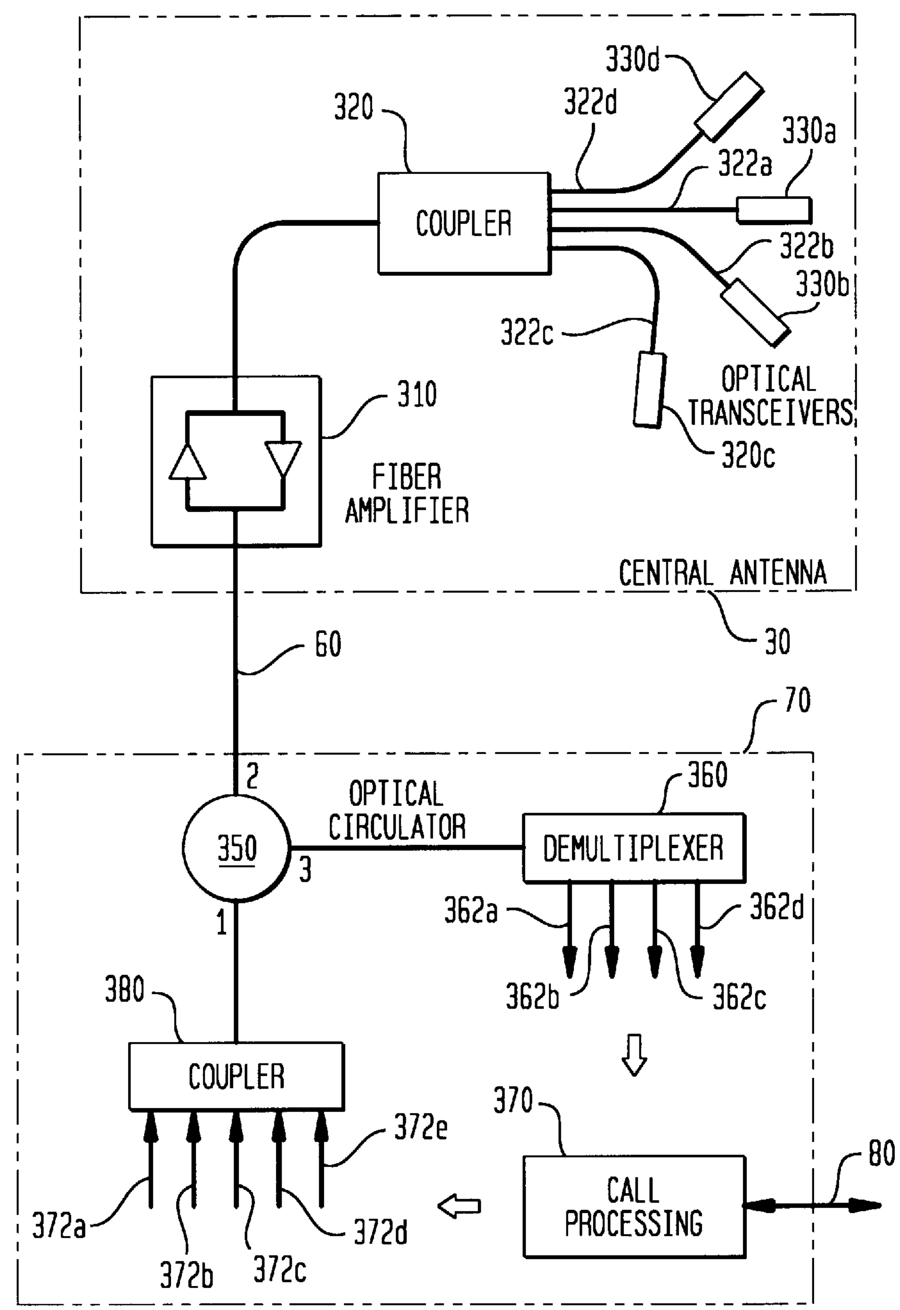
FIG. 3 is a more detailed, but still simplified schematic block diagram of an illustrative embodiment of another portion of the apparatus shown in FIG. 1.

FIG. 3 shows an illustrative embodiment of elements 30, 60, and 70 in more detail. At central antenna 30 a plurality of free-space optical transceivers 330*a–d* are respectively aimed at subcell antennas 50*a–d.* Each of transceivers 330*a–d* transmits the light it receives from mobile telephone switching office 70 via optical fiber 60 to the associated subcell antenna 50*a–d.* As described earlier, this transmission from antenna 30 to antennas 50*a–d* is free-space optical transmission 32*a–d.* All of transceivers 330*a–d* may transmit substantially the same information. This information includes a separate message information wavelength for each of subcells 40*a–d,* and a further separate control information wavelength carrying information for controlling all of subcells 40*a–d.* Each subcell apparatus filters out the message information wavelength intended for it, as well as the control information wavelength, as described above in connection with FIG. 2.

Each of transceivers 330*a–d* also receives the light 52*a–d* transmitted back to central antenna 30 from the associated subcell antenna 50*a–d.* As noted earlier in connection with FIG. 2, each of subcells 50*a–d* preferably transmits back to antenna 30 via a unique light wavelength.

Coupler 320 distributes the light coming in from optical fiber 60 to the optical fibers 322*a–d* leading to transceivers 330*a–d*. In the opposite direction, coupler 320 combines the light received back from subcell antennas 50*a–b* for application to optical fiber 60. Optical fiber 60 may include a conventional erbium doped fiber amplifier 310 for optically amplifying the light passing in either or both directions along the optical fiber.

At mobile telephone switching office 70 forward propagating optical circulator 350 directs light coming in from optical fiber 60 via port 2 to demultiplexer 360 via another optical fiber connected to port 3. Demultiplexer 360 separates the multiple light wavelengths it receives from port 3 of the optical circulator into separate optical signals 362*a–d*. Each of these optical signals is applied to an optical detector in order to produce an electronic signal applied to conventional call processing circuitry 370.

Call processing circuitry 370 also produces electronic signals for transmission to each of subcells 40*a–d*. Each of these electronic signals is converted to a respective optical signal 372*a–e* having a separate wavelength. Signals 372*a–d* are respectively the message information signals for subcells 40*a–d,* while signal 372*e* is the control information signal for all of subcells 40*a–d*. Coupler 380 combines these five optical signals into a wavelength division multiplexed optical signal which is applied to port 1 of optical circulator 350. Circulator 350 transmits this signal from port 1 to port 2, where it is applied to optical fiber 60 for transmission to central antenna 30.

It will be noted that in the depicted preferred embodiment an existing fiber optic link 60 is used between mobile telephone switching office 70 and central antenna 30 so that optical signals can pass substantially directly between optical fiber 60, on the one hand, and free-space links 32*a–d* and 52*a–d,* on the other hand. No electronic circuitry is needed to interface between these optical fiber and free-space links. This facilitates the provision of high-speed and error-free communication between mobile telephone switching office 70 and subcells 40*a–d*.

It will be understood that the foregoing is only illustrative of the principles of this invention, and that various modifications can be made by those skilled in the art without departing from the scope and spirit of the invention. For example, subdividing cell 20 into four subcells 40*a–d* is only illustrative, and a cell can be subdivided into any number of subcells. As another example of modifications within the scope of the invention, the various components shown in the drawings are presently preferred, but various aspects of the invention can be implemented using other components if desired. The optical communication described herein can be by either digital or analog modulation of the light being transmitted. As a possible alternative to using multiple light wavelengths to respectively transmit information to the multiple subcells, the information for all subcells could be transmitted on one wavelength, with each subcell including apparatus for electronically extracting the information intended for that subcell. This would somewhat simplify the optical processing apparatus for light being transmitted to and processed by the subcells, but it would increase the complexity of the electronic circuitry 200 required at each subcell.

The invention claimed is:

1. A wireless communication method comprising:

a) communicating information between a communication network and a central location;

b) communicating at least some of said information between said central location and each of a plurality of remote locations via substantially unguided light passing between said central location and each of said remote locations; and;

c) communicating at least some of said information between each of said remote locations and wireless communication devices in the vicinity of said remote location via radio signals broadcast between said remote location and said wireless communication devices;

wherein said communicating of information between said communication network and said central location is via optical communication; and wherein said information includes message information and control information.

2. The method defined in claim 1 wherein said optical communication is guided via optical fiber between said communication network and said central location.

3. The method defined in claim 1 wherein said communicating between said communication network and said central location is bi-directional.

4. The method defined in claim 3 wherein light of different wavelengths is used for communicating in each direction.

5. The method defined in claim 1 wherein said communicating between s aid central location and each of said remote locations is bi-directional.

6. The method defined in claim 5 wherein light of a different wavelength is used for communicating from each of said remote locations to said central location.

7. The method defined in claim 1 wherein said communicating between said remote locations and said wireless communication devices is bi-directional.

8. The method defined in claim 1 wherein said communicating between said communication network and said central location is bi-directional, and wherein light of different wavelengths is used for communicating in each direction.

9. A wireless communications system comprising:

a plurality of central optical transceivers associated with a cell;

a plurality of remote optical transceivers, each of which is associated with a respective one of a plurality of subcells within said cell, each of said remote optical transceivers being adapted to communicate with a respective one of said central optical transceivers via substantially unguided light passing between said remote optical transceiver and the associated central optical transceiver; and electronic circuitry associated with each of said remote optical transceivers for converting between radio frequency signals in the associated subcell and light communicated by said remote optical transceiver;

wireless communications control circuitry remote from said central and remote optical transceivers; and a communications link between said wireless communications control circuitry and said central optical transceivers.

10. A wireless communications system comprising:

a plurality of central optical transceivers associated with a cell;

a plurality of remote optical transceivers, each of which is associated with a respective one of a plurality of subcells within said cell, each of said remote optical transceivers being adapted to communicate with a respective one of said central optical transceivers via substantially unguided light passing between said remote optical transceiver and the associated central optical transceiver; and electronic circuitry associated with each of said remote optical transceivers for converting between radio frequency signals in the associated subcell and light communicated by said remote optical transceiver;

wireless communications control circuitry remote from said central and remote optical transceivers;

a communications link between said wireless communications control circuitry and said central optical transceivers; and wherein said communication link comprises optical fiber between said wireless communications control circuitry and said central optical transceivers.

11. The apparatus defined in claim 10 wherein light having a unique wavelength is used for communicating information associated with each of said subcells.

12. The apparatus defined in claim 10 wherein light having a first unique wavelength is used for communicating information to each subcell and wherein light having a second unique wavelength is used for communicating information from each subcell.

13. The apparatus defined in claim 12 wherein each of said central optical transceivers transmits to the associated remote optical transceiver light which includes said wavelengths used for communication to all of said subcells.

14. The apparatus defined in claim 13 wherein each of said remote optical transceivers includes optical filter apparatus for selecting from the wavelengths received by said transceiver the wavelength used for communication to the associated subcell.

15. The apparatus defined in claim 14 wherein said optical filter apparatus comprises Bragg grating apparatus.

16. The apparatus defined in claim 12 wherein light having a further unique wavelength is used for communicating control information to all of said subcells.

17. A wireless communications system comprising:

a plurality of central optical transceivers associated with a cell;

a plurality of remote optical transceivers, each of which is associated with a respective one of a plurality of subcells within said cell, each of said remote optical transceivers being adapted to communicate with a respective one of said central optical transceivers via substantially unguided light passing between said remote optical transceiver and the associated central optical transceiver; and electronic circuitry associated with each of said remote optical transceivers for converting between radio frequency signals in the associated subcell and light communicated by said remote optical transceiver;

wherein light having a first unique wavelength is used for communicating information to each subcell and wherein light having a second unique wavelength is used for communicating information from each subcell; and wherein light having a further unique wavelength is used for communicating control information to all of said subcells.

18. The apparatus defined in claim 17 wherein each of said central optical transceivers transmits to the associated remote optical transceiver light which includes said wavelengths used for communicating said information and said control information to all of said subcells.

19. The apparatus defined in claim 18 wherein each of said remote optical transceivers includes optical filter apparatus for selecting from the wavelengths received by said transceiver the wavelength used for communicating said information to the associated subcell and the wavelength used for communicating said control information to all of said subcells.

20. The apparatus defined in claim 19 wherein said filter apparatus comprises Bragg grating apparatus.

21. A wireless communications system comprising:

a plurality of central optical transceivers associated with a cell;

a plurality of remote optical transceivers, each of which is associated with a respective one of a plurality of subcells within said cell, each of said remote optical transceivers being adapted to communicate with a respective one of said central optical transceivers via substantially unguided light passing between said remote optical transceiver and the associated central optical transceiver; and electronic circuitry associated with each of said remote optical transceivers for converting between radio frequency signals in the associated subcell and light communicated by said remote optical transceiver;

wireless communications control circuitry remote from said central and remote optical transceivers; and a communications link between said wireless communications control circuitry and said central optical transceivers;

wherein said communication link comprises optical fiber between said wireless communications control circuitry and said central optical transceivers; and wherein said optical fiber transmits light from said wireless communications control circuitry to said central optical transceivers, each of which passes a portion of said light on to the associated remote optical transceiver.

22. The apparatus defined in claim 21 wherein said optical fiber includes erbium doped fiber amplifier apparatus for optically amplifying light being transmitted via said optical fiber.

23. A wireless communications system comprising:

a plurality of central optical transceivers associated with a cell;

a plurality of remote optical transceivers, each of which is associated with a respective one of a plurality of subcells within said cell, each of said remote optical transceivers being adapted to communicate with a respective one of said central optical transceivers via substantially unguided light passing between said remote optical transceiver and the associated central optical transceiver; and electronic circuitry associated with each of said remote optical transceivers for converting between radio frequency signals in the associated subcell and light communicated by said remote optical transceiver;

wireless communications control circuitry remote from said central and remote optical transceivers;

a communications link between said wireless communications control circuitry and said central optical transceivers;

wherein said communication link comprises optical fiber between said wireless communications control circuitry and said central optical transceivers; and wherein said optical fiber transmits to said wireless communications control circuitry light received by each of said central optical transceivers from the associated remote optical transceiver.

24. The apparatus defined in claim 23 wherein each of said remote optical transceivers transmits light of a unique wavelength to the associated central optical transceiver, and wherein said apparatus further comprises optical coupler apparatus for combining, for application to said optical fiber, the light received by all of said central optical transceivers from said remote optical transceivers.

25. The apparatus defined in claim 23 wherein said optical fiber includes erbium doped fiber amplifier apparatus for optically amplifying light being transmitted via said optical fiber from said central optical transducers to said wireless communications control circuitry.

26. A wireless communication method comprising:

a) communicating information between a communication network and a central location;

b) communicating at least some of said information between said central location and each of a plurality of remote locations via substantially unguided light passing between said central location and each of said remote locations; and;

c) communicating at least some of said information between each of said remote locations and wireless communication devices in the vicinity of said remote location via radio signals broadcast between said remote location and said wireless communication devices;

wherein said information includes message information and control information; and wherein said control information includes radio frequency assignment information for controlling selection of radio frequencies to be used for said communicating between said remote locations and said wireless communication devices.

27. A wireless communication method comprising:

a) communicating information between a communication network and a central location;

b) communicating at least some of said information between said central location and each of a plurality of remote locations via substantially unguided light passing between said central location and each of said remote locations; and;

c) communicating at least some of said information between each of said remote locations and wireless communication devices in the vicinity of said remote location via radio signals broadcast between said remote location and said wireless communication devices;

wherein said communicating between said communication network and said central location is via optical communication;

wherein said communicating between said communication network and said central location is bi-directional, and wherein light of different wavelengths is used for communicating in each direction; and wherein said information includes message information and control information, and wherein light of different wavelengths is used for communicating said message information and said control information from said communication network to said central location.

28. The method defined in claim 27 wherein said message information includes a plurality of message portions, each of which is for use at a respective one of said remote locations, and wherein light of a different wavelength is used for communicating each of said message portions from said communication network to said central location.

29. A wireless communication method comprising:

a) communicating information between a communication network and a central location;

b) communicating at least some of said information between said central location and each of a plurality of remote locations via substantially unguided light passing between said central location and each of said remote locations; and;

c) communicating at least some of said information between each of said remote locations and wireless communication devices in the vicinity of said remote location via radio signals broadcast between said remote location and said wireless communication devices;

wherein said communicating between said communication network and said central location is bi-directional;

wherein light of different wavelengths is used for communicating in each direction; and wherein said information includes message information and control information, and wherein light of different wavelengths is used for communicating said message information and said control information from said central location to said remote locations.

30. The method defined in claim 29 wherein said message information includes a plurality of message portions, each of which is for use at a respective one of said remote locations, and wherein light of a different wavelength is used for communicating each of said message portions from said central location to said remote locations.

31. The method defined in claim 30 wherein said central location communicates all of said message portions to all of said remote locations.

32. The method defined in claim 31 further comprising:

filtering at each of said remote locations to select the wavelength used for the message portion for use at that remote location and to reject the wavelengths used for the message portions for use at others of said remote locations.

* * * * *